United States Patent
Perkins, II et al.

(10) Patent No.: US 12,181,372 B2
(45) Date of Patent: Dec. 31, 2024

(54) STABILIZER MAT TEST SYSTEM AND METHODS

(71) Applicant: RAPTOR TECH, INC., Downers Grove, IL (US)

(72) Inventors: Paul S. Perkins, II, Downers Grove, IL (US); Andrew S. Oliver, Downers Grove, IL (US)

(73) Assignee: RAPTOR TECH INC., Downers Grove, IL (US)

( * ) Notice: Subject to any disclaimer, the term of this patent is extended or adjusted under 35 U.S.C. 154(b) by 322 days.

(21) Appl. No.: 17/952,052

(22) Filed: Sep. 23, 2022

(65) Prior Publication Data

US 2023/0092856 A1    Mar. 23, 2023

Related U.S. Application Data

(60) Provisional application No. 63/247,457, filed on Sep. 23, 2021.

(51) Int. Cl.
*G01M 17/04* (2006.01)
*B66C 13/16* (2006.01)
*B66C 23/78* (2006.01)

(52) U.S. Cl.
CPC ............. *G01M 17/04* (2013.01); *B66C 13/16* (2013.01); *B66C 23/78* (2013.01)

(58) Field of Classification Search
CPC ........ G01M 17/04; B66C 13/16; B66C 23/78; B66C 15/00
See application file for complete search history.

(56) References Cited

U.S. PATENT DOCUMENTS

| | | | |
|---|---|---|---|
| 2015/0292999 A1* | 10/2015 | Futatsuka | G01N 3/42 73/81 |
| 2016/0356676 A1* | 12/2016 | Sauser | G01N 3/42 |
| 2017/0296113 A1* | 10/2017 | Cheung | A61B 5/4023 |

FOREIGN PATENT DOCUMENTS

| | | | | |
|---|---|---|---|---|
| CN | 110231142 A | * | 9/2019 | G01B 21/02 |
| EP | 1840548 A1 | * | 10/2007 | G01L 27/005 |
| EP | 2713152 A1 | * | 4/2014 | B66C 15/00 |
| EP | 2727876 B1 | * | 11/2016 | B66C 23/78 |

* cited by examiner

*Primary Examiner* — Francis C Gray
(74) *Attorney, Agent, or Firm* — Allison M. Corder

(57) ABSTRACT

A system and methods for stabilizer mat testing comprising a compressible material element and platen elements. Two stabilizer mats are positioned on opposing surfaces of the compressible material element and located between the platen elements. A force is supplied to the test system, i.e., a fluid supplied by a fluid supply component to the compressible material element, a load supplied by a load supply component to the compressible material element, or both. Displacement measurements from the stabilizer mat are obtained and evaluated. Stabilizer mat testing may be a standardized method used to validate design and manufacture, to test a simulated use that may occur in the field, to monitor life cycle, or to certify performance.

20 Claims, 7 Drawing Sheets

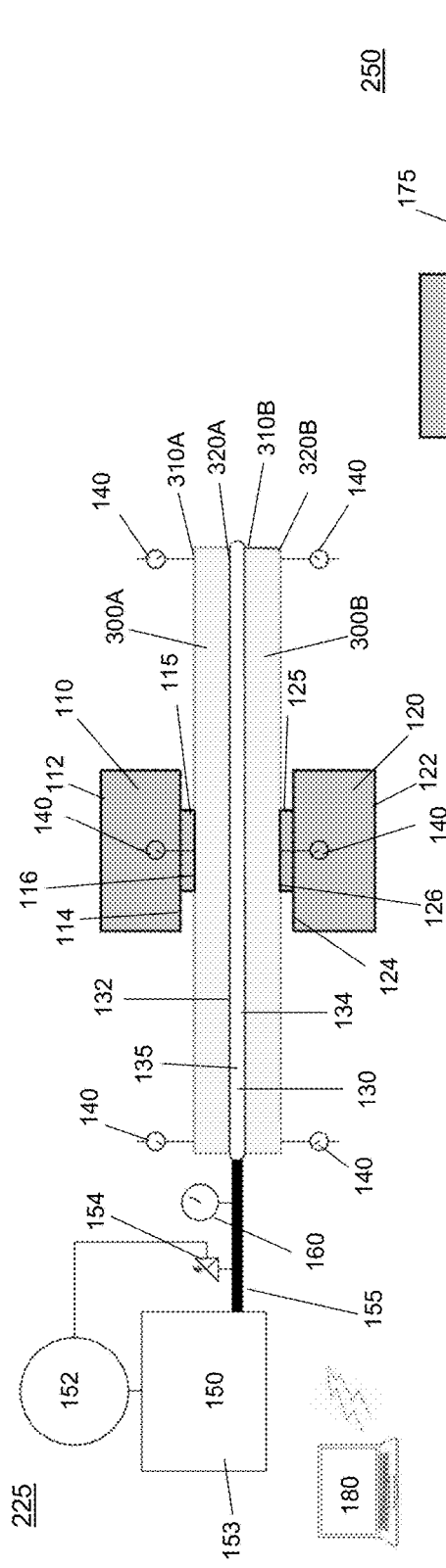

STABILIZER MAT TEST SYSTEM AND METHODS

FIELD OF THE INVENTION

The invention relates generally to the field of construction and more particularly, to heaving rigging and lifting. The invention relates to a system and methods for testing mats, otherwise referred to as "pads", that stabilize and support equipment—e.g., cranes, outriggers, gantries, vessels for temporary staging—during use. Stabilizer mats spread concentrated large loads across its area to reduce ground pressure as well as to protect the ground (surface, buried utilities and area below) on which the equipment is placed.

BACKGROUND OF THE INVENTION

Stabilizer mats are used with equipment such as cranes or other vehicles with outriggers or tracks. A stabilizer mat is used to stabilize the equipment and protect the ground on which the equipment is placed. The term "ground" refers to a surface and area below. The mat stabilizes the equipment during use to prevent the equipment from moving, e.g., sinking into the ground, toppling over, etc. In addition, the mat prevents the equipment from breaking through the ground—brick, rock, concrete, asphalt, sand, soil—and damaging the equipment or utilities below.

Stabilizer mats are used to provide a sturdy, even surface creating a steady base during equipment operation. Stabilizer mats additionally distribute concentrated loads. Stabilizer mats may be manufactured from various materials, including but not limited to natural materials, composites, steel, aluminum, and any variation or combination thereof.

Mats also deflect or deform during use which reduces the ability of the mat to distribute load evenly over the soil surface. Specifically, the more a stabilizer mat deflects or deforms, the greater the peak pressures become at the soil surface. Typically, testing is performed on mats to determine their performance rating. However, a problem is that load capacities are not determined by reliably consistent methods such as standardized tests.

In one known testing method, mat load performance is determined using a free span test frame. However, this testing method does not accurately predict performance of the mat under uniform loading for which it is designed since the mat is unsupported along its length. For uniform load testing, the mat is typically subjected to a full-scale load test over existing ground (e.g., soil) using heavy test weights to establish ground pressure imparted under the mat. The downside is that this testing method is time consuming and expensive. In addition, it is impractical for use on an industry wide level and not suited for initial or periodic testing of stabilizer mats.

As mentioned above, stabilizer mats are not bound by a standardized test system or method which may be used to facilitate proof of compliance with governing safety standards. There is currently no standard for certification or validation of stabilizer mats either immediately after manufacture or for periodic testing after use in the field (which is a core concept for many standards applicable to equipment testing). Furthermore, there are no practical tests that are rapid, accurate, and generally suitable for large volume repetitive testing.

The invention satisfies these needs by providing a system and method for stabilizer mat testing that captures mat behavior in the field, and by further providing a test system that may be used as a standard for certification procedures that may be implemented to ensure appropriate use of equipment mats.

BRIEF SUMMARY OF THE INVENTION

The stabilizer mat test system and methods according to the invention may be applied as a standard for testing stabilizer mats. Testing may be applied immediately following manufacture of the mat and/or during its life cycle to monitor integrity since mats deteriorate or are compromised from repetitive use. The invention may provide standardized testing for certification and validation of stabilizer mats and may further be incorporated into local and national standards to improve safety in the construction industry.

The invention is particularly useful when testing mats for which material properties may deteriorate over time or from numerous uses, mats which have been accidentally overloaded, or in cases where suitability of a mat for a particular application is not known (such as extreme temperatures, cases where limiting deformation is critical, or unique applications).

Generally, load or displacement of the mat may govern acceptance for use in a particular application. The test system and method according to the invention allows both these and other criteria to be established in a compact, efficacious manner.

Advantageously, the invention provides a simple, accurate and repeatable method to validate mat capacity and performance in order to bolster suitability for a particular mat in a particular situation and to close the safety loophole that is currently being ignored or, at best, misunderstood by a majority of the industry. Accurate deflection or deformation data may be used to assist with the selection of a stabilizer mat suitable for an intended purpose.

The invention may improve awareness of mat suitability and safety. To drive the industry forward, the invention is intended to standardize test method for all stabilizer mats so an efficacious industry wide comparison can be made between mats of all types.

According to the invention, displacement data of a stabilizer mat is determined according to a system and method that considers the characteristics and materials of the ground on which the stabilizer mat is placed. For example, certain ground surfaces may include areas beneath that differ in composition—e.g., underground utilities—or are composed of different materials—e.g., soil, ash, crushed brick, concrete, sand, etc. each having particular response characteristics. The test system and methods according to the invention considers a uniform applied load on the bearing side (ground side) of the mat, which is in-line with reaction pressures experienced when in use.

After test, stabilizer mats may be visually inspected for signs of deformation or deflection. Data measurements may be analyzed to determine if mats comply with pre-established criteria for deformation and deflection, recovery and performance.

The measurements may be recorded incrementally or continuously and used for a variety of purposes including, but not limited to: (1) comparing mats from different manufacturers or comparing the same mat to prior test results, (2) validating mat design, (3) providing real world displacement or deformation characteristics for use in engineering studies, (4) determining mat deterioration or misuse over time based on subsequent tests of any given mat, (5) certifying mats such as for use in the field based on measured load capacity or displacement/deformation characteristics.

It is contemplated that test certificates and performance characteristics, or pass/fail test results based on performance criteria defined by the mats may be issued, for example, for compliance with regulatory bodies such as Occupational Safety and Health Administration (OSHA) or other Industry based safety systems.

The invention and its attributes and advantages will be further understood and appreciated with reference to the accompanying drawings. The described embodiments are to be considered in all respects only as illustrative and not restrictive, and the scope of the invention is not limited to the foregoing description. Those of skill in the art will recognize changes, substitutions and other modifications that will nonetheless come within the scope of the invention and range of the claims.

BRIEF DESCRIPTION OF THE FIGURES

The preferred embodiments of the invention are described in conjunction with the attached figures that illustrate embodiments of the invention.

FIG. 2A illustrates a cross section view of a test system according to one embodiment of the invention.

FIG. 2B illustrates a cross section view of a test system according to another embodiment of the invention.

FIG. 2C illustrates a cross section view of a test system according to yet another embodiment of the invention.

DETAILED DESCRIPTION OF THE INVENTION

Figure 1A:
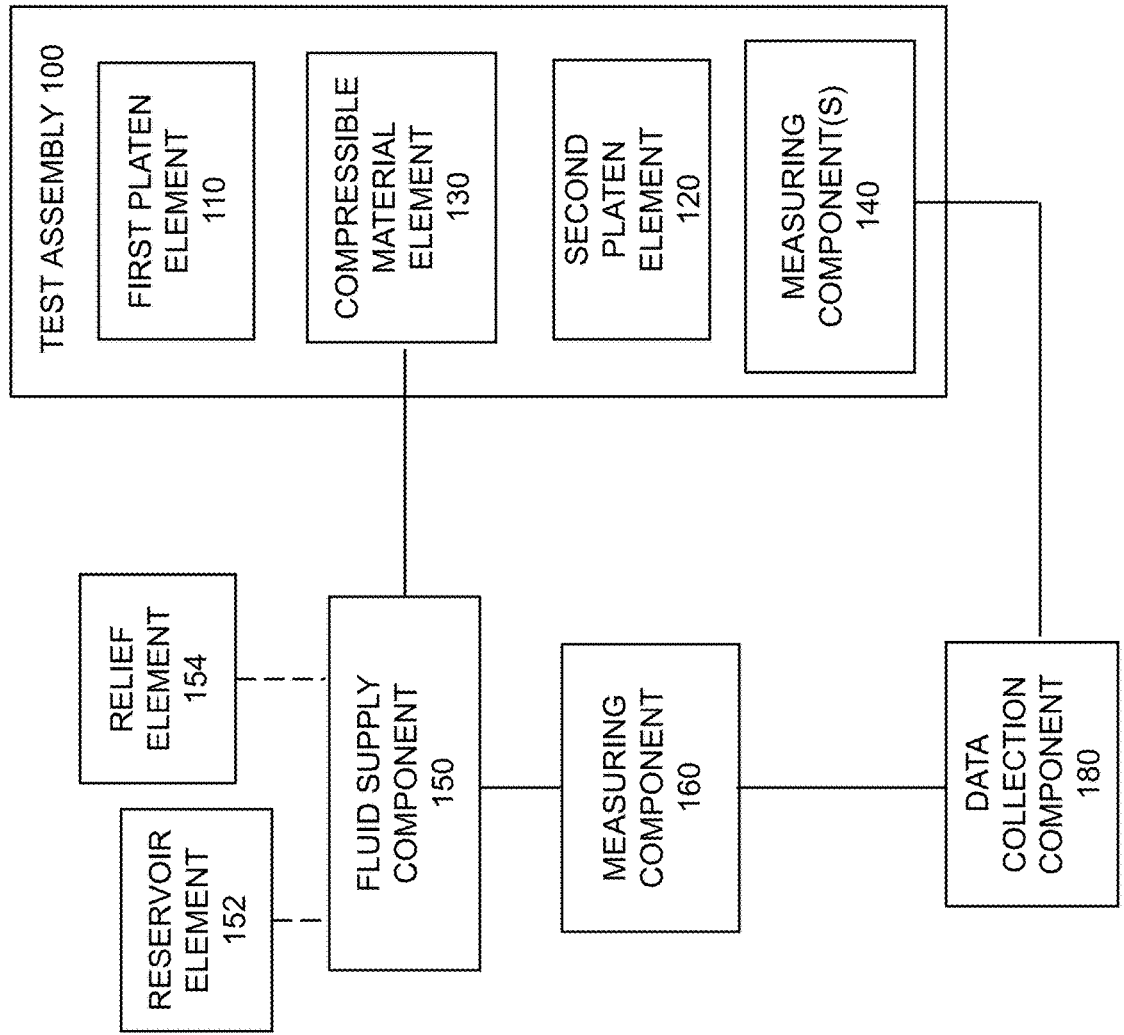
FIG. 1A is a block diagram of the stabilizer mat test system according to one embodiment of the invention.

The invention provides an improved understanding of stabilizer mat behavior including with regard to different mat materials and industry applications. The invention provides a standardized test system and methods; Data generated may serve as a reference to safety practices within the industry as a whole.

The test system and methods according to the invention may help establish best use and selection practices for materials, lead to more efficient designs, allow economic comparison between different stabilizer mat types, and standardize acceptance and safety procedures in the industry. Stabilizer mat testing may be used to validate design and manufacture, to test a simulated use that may occur in the field, to monitor life cycle, or to certify performance.

According to the invention, a test system for stabilizer mats comprises a compressible material element, platen elements, and a measuring component.

The compressible material element may be comprised of any material or combination of materials that can withstand pressure while remaining flexible or elastically responsive. Any material is contemplated that may be expanded/contracted, e.g., elastomer, foam, springs, rubber, light gage steel. The compressible material element may be solid/semi-solid or hollow and comprise a single element or a plurality of elements. In one embodiment, the compressible component is a bladder that is hollow and constructed of an elastomer material that may be inflated/deflated through a space inside the bladder. In another embodiment, the compressible material component is a slab that is solid or semi-solid elastomer material.

Platen elements are flat platforms and may be constructed of any material, such as metal, glass, plastic, wood, etc. The platen elements may further include spacer block elements, which may be made from the same or different material as the platen elements.

Spacer block elements may be separate components that are located on the stabilizer mat prior to positioning the platen elements. Or the spacer block elements may be a portion of a platen element such as integrated together. The spacer block elements simulate the appropriate load application and load path from the top of the mat to the simulated ground surface provided by the compressible material component. Dimensions of the spacer block element may mimic the external load application footprint.

Other materials from which the spacer block elements may be fabricated include Ultra High Molecular Weight (UHMW) polyethylene, plastic aluminum, steel or other sufficiently rigid material. Spacer block elements may be of various sizes and/or shapes. These sizes and/or shapes are selected based on the size and/or shape of the crane outrigger feet or crawler crane tracks to be used on the mats in the field.

Stabilizer mats are positioned on opposing surfaces of the compressible material element. For purposes of this application, a stabilizer mat includes a bearing side (ground side) opposing a working side (crane side). The mats are positioned on the compressible material element so that both ground sides of the mats are positioned on the compressible material element—i.e., one stabilizer mat is inverted. The compressible material element artificially represents the ground surface of the application for the mat under test.

The compressible material element with stabilizer mats is positioned between platen elements. The platen elements may be centered or offset from the center of the mat under test. It is contemplated that there may be multiple platens to provide multiple reaction points at any location. This may be used to similar actual field conditions (which may be validated by test).

A force is supplied to the test system, i.e., a fluid supplied by a fluid supply component to the compressible material element, a load supplied by a load supply component to the compressible material element, or both. Displacement data from the stabilizer mat is obtained and evaluated.

Tests may be performed by single load application or multiple load applications to the same test stack-up for either static or dynamic loads. Tests may also be performed at different temperatures within a temperature-controlled enclosure to determine performance specific to these conditions which may be important to evaluate stabilizer mats in extreme conditions and climates.

FIG. 1A is a block diagram of one embodiment of the stabilizer mat test system 25 according to one embodiment of the invention. A test assembly 100 includes a compressible material element 130 and two platen elements 110, 120. The assembly 100 further includes one or more measuring components 140 for measuring displacement values resultant from the load applied to the stabilizer mats under test. These measuring components 140 may be a dial gauge or transducer, laser distance meters, ultrasonic meters or any other device which gives deformation readings at known points on the mats being tested. Displacement of the stabilizer mats is resultant from pressure, force, or a combination of both.

A fluid supply component 150 provides a fluid to the compressible material element 130. Any fluid that moves or flows is contemplated. Fluids include, for example, liquids and gases such as air. It is also contemplated that the fluid supply component 150 includes a reservoir element 152 and relief element 154. The reservoir element 152 may be used to store the fluid for use by the fluid supply component 150. The relief element 154, such as a valve structure, may be used to adjust pressure of the fluid supplied to the compressible material element 130.

A measuring component 160, such as a gauge, may be used to measure pressure values introduced to the compressible material element 130 by the fluid supply component 150. A data collection component 180 may be used to record data including displacement and pressure values. Data may be recorded automatically such as by a data-logger or other digital means and may be further analyzed by a computer program or even manual methods. Furthermore, data obtained—either automatically or manually—may be externally reviewed such as by an entity or engineer of record for validation.

Figure 1B:
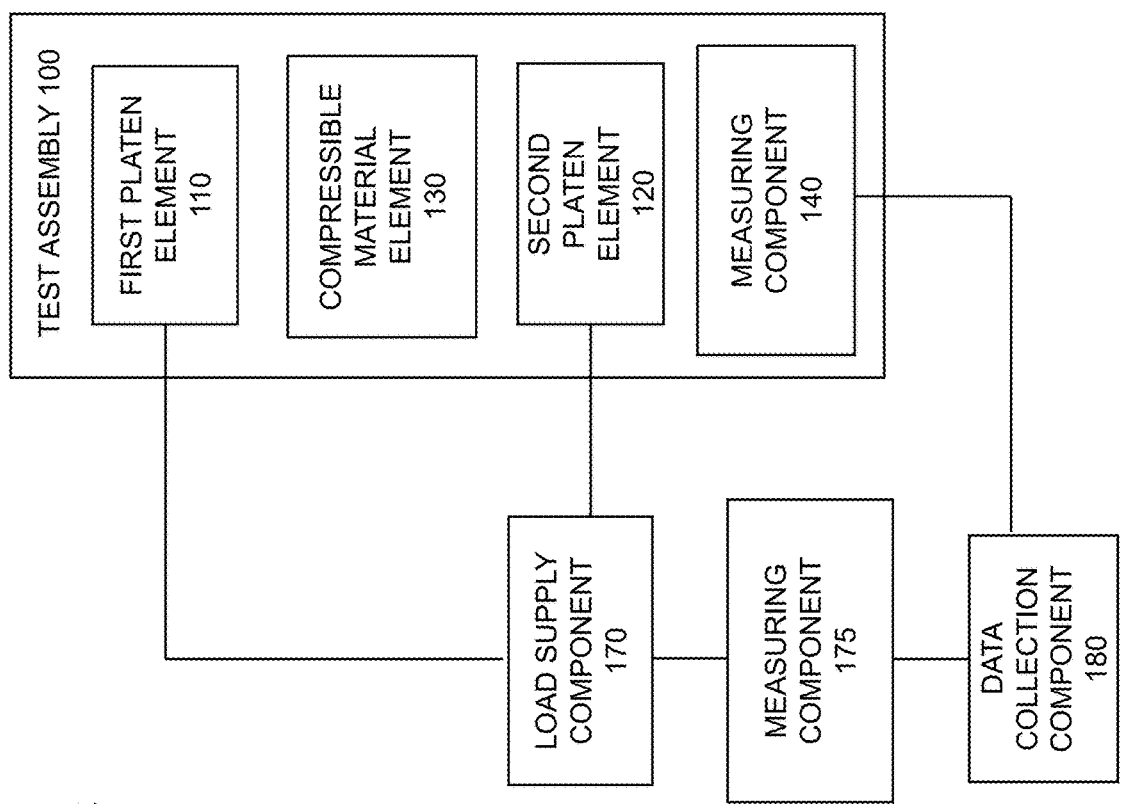
FIG. 1B is a block diagram of the stabilizer mat test system according to another embodiment of the invention.

FIG. 1B shows a block diagram of the stabilizer mat test system 50 according to another embodiment of the invention. In this embodiment, a load supply component 170 provides a force to the compressible material element 130 through the platen elements 110, 120. A measuring component 175, such as a gauge, may be used to measure force values introduced to the compressible material element 130 by the load supply component 170. Data including displacement values and force values may be collected by the data collection component 180.

Figure 1C:
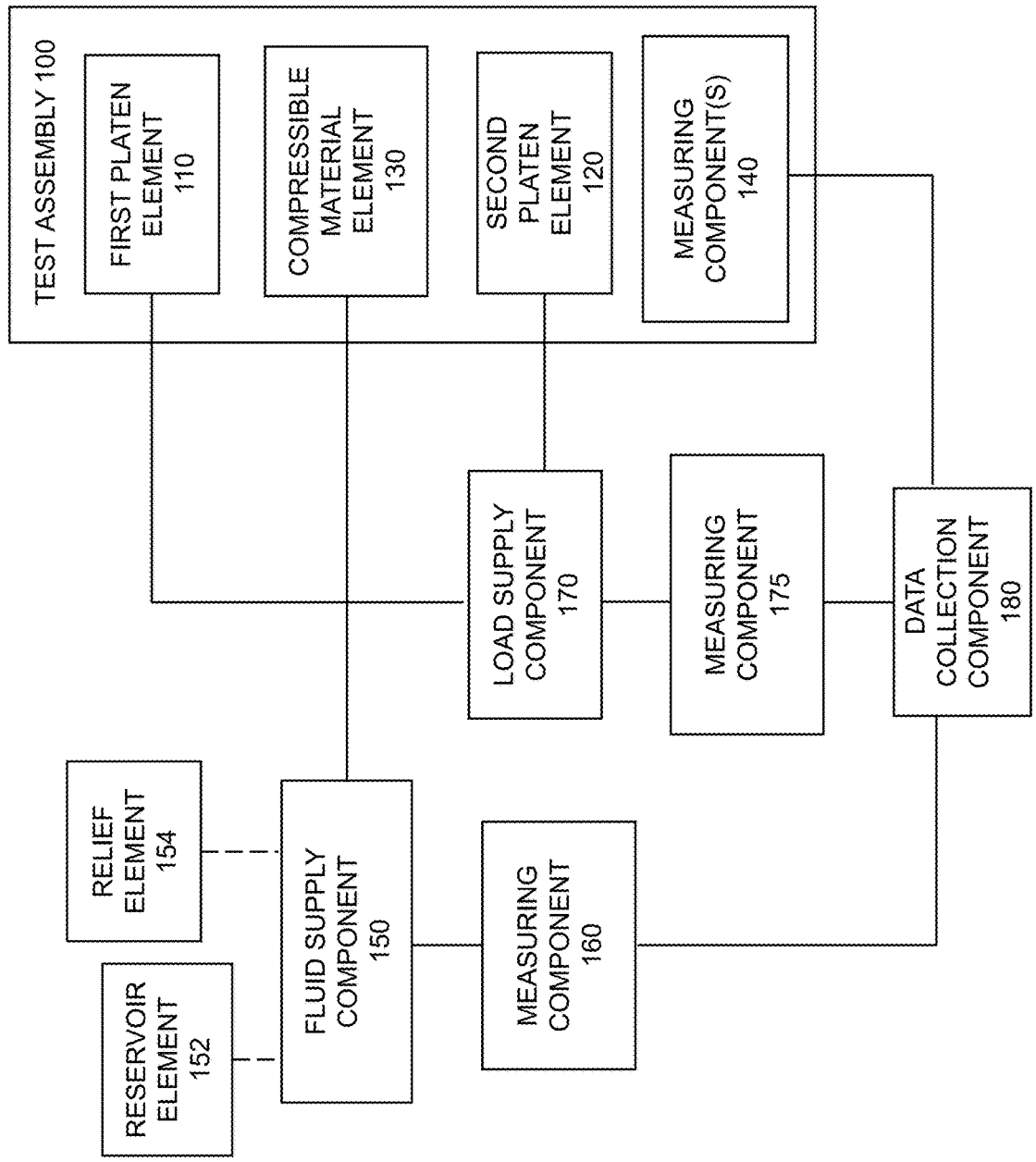
FIG. 1C is a block diagram of the stabilizer mat test system according to another embodiment of the invention.

FIG. 1C is a block diagram of the stabilizer mat test system 75 according to another embodiment of the invention. In this embodiment, both a fluid supply component 150 and a load supply component 170 are used. In this embodiment, a data collection component 180 gathers displacement values (from measuring component 140), pressure values (from measuring component 160), and force values (from measuring component 175).

Test results include recorded measurements that include, but are not limited to: (1) reaction load at platen(s) (e.g., total load), (2) pressure in the compressible component, (3) deformation/deflection of the mats under test, (4) hydraulic pressure in actuated platen(s), (5) response of mat when unloaded (elastic or plastic displacement or deformation, cracks, distortion etc.).

FIG. 2A, FIG. 2B, and FIG. 2C illustrate portions of a test systems according to the embodiments described by FIG. 1A, FIG. 1B, and FIG. 1C, respectively. Although the embodiments shown and described are directed to testing mats in pairs, testing mats singularly is also contemplated. The following figures illustrate the mats under test in a horizontal position, but it should be noted that mats may be tested in any orientation.

In the embodiment shown and described in FIG. 2A, the platen elements 110, 120 are fixed. The compressible material 130 is in the form of a bladder element 135 and a fluid supply component 150 is in the form of an air compressor 153.

As shown by FIG. 2A, the bladder element 135 comprises a first surface 132 and a second surface 134. Once assembled, the first surface 132 receives a first stabilizer mat 300A and the second surface 134 receives a second stabilizer mat 300B.

Specifically, the first stabilizer mat 300A includes an upper surface 310A and a lower surface 320A. The lower surface 320A is positioned on the bladder element 135. The second stabilizer mat 300B is inverted so that the upper surface 310B is positioned on the bladder element 135. The platen element 110 is positioned on the upper surface 310A of the first stabilizer mat 300A and platen element 120 is positioned on the lower surface 320B of the second stabilizer mat 300B.

In certain embodiments of the invention, the platen elements 110, 120 may further include spacer block elements 115, 125 respectively. Specifically, a bottom surface 114 of the platen element 110 includes spacer block element 115. A bottom face 116 of the spacer block element 115 is located on the upper surface 310A of the first stabilizer mat 300A. Similarly, a bottom surface 124 of the platen element element 120 includes space block element 125. A bottom face 126 of space block element 125 is located on the lower surface 320B of the second stabilizer mat 300B. In this embodiment shown, spacer block elements are integrated as a portion of the platen element. Alternatively, spacer block elements may be separate components that are located on the stabilizer mat prior to positioning the platen elements.

One or more measuring components 140 are positioned on the stabilizer mats and used to measure displacement values of the stabilizer mats under test. As shown, displacement measuring components 140 may be positioned on or near a center of mat, on or near the perimeter of mat, or at any location necessary for a functional test.

An air compressor 153 provides air to the bladder element 135 through a high-pressure supply line with fitting 155. The air compressor 153 may access air from a reservoir element 152. During inflation, pressure is introduced to the bladder element 135. Pressure is monitored by a pressure gauge 160 and regulated by a relief element 154. A load is applied to the stabilizer mats 300A, 300B by increasing air pressure in the bladder element 135.

As a result, the bladder element 135 expands, or inflates, and imparts a load to the lower surface 320A of the first stabilizer mat 300A and the upper surface 310B of the second stabilizer mat 300B. The load is applied until the desired pressure, as explained further below, is reached.

The pressure imparted may be uniform pressure over the entire compressible component or may be varied over the component. The load applied to the compressible component is configured to represent the ground characteristics and materials on which the stabilizer mat may be used. Examples of load applied to the mat under test, and achieved by imparting pressure to the compressible component, include a quintessentially uniform load distribution, trapezoidal load distribution, triangular load distribution, or a free span load distribution.

In the embodiment shown and described in FIG. 2B, a portion of platen element 110 is moveable and one platen element 120 is fixed (though it is contemplated that a portion of both platen elements 110, 120 may be moveable). The compressible material 130 is in the form of a slab element 137. The platen component 110 comprises a load supply component 170 that actuates a hydraulic jack or ram 178 (although any mechanical means is contemplated).

The stabilizer mats 300A, 300B are located on the slab element 137 and the hydraulic ram 178 moves the spacer block element 115 of the platen element 110. Force is increased as the hydraulic ram 178 pushes the spacer block element 115 into the stabilizer mats 300A, 300B and the slab element 137. Force is applied until the desired load or pressure is achieved, as explained further below. Measuring component 175, such as a gauge, may be used to measure force values of the load supply component 170 introduced by the hydraulic jack 178 to the slab element 137.

The embodiment illustrated in FIG. 2C uses both a fluid supply component 150 and a load supply component 170. In the embodiment shown and described in FIG. 2C, a portion of one platen element 110 is moveable through use of a hydraulic jack 178 and one platen element 120 is fixed. The compressible material 130 is in the form of a bladder element 135 and a fluid supply component 150 is in the form of an air compressor 153. In this embodiment, the bladder element 135 is inflated before applying a load using the hydraulic jack 178. The hydraulic jack 178 moves the spacer block element 115 of the platen element 110 to apply force to the stabilizer mats 300A, 300B. Force is increased as the hydraulic jack 178 pushes the spacer block element 115 into the stabilizer mats 300A, 300B separated by the bladder element 135. Force is applied until the desired load or pressure, as explained further below, is reached.

Figure 3A:
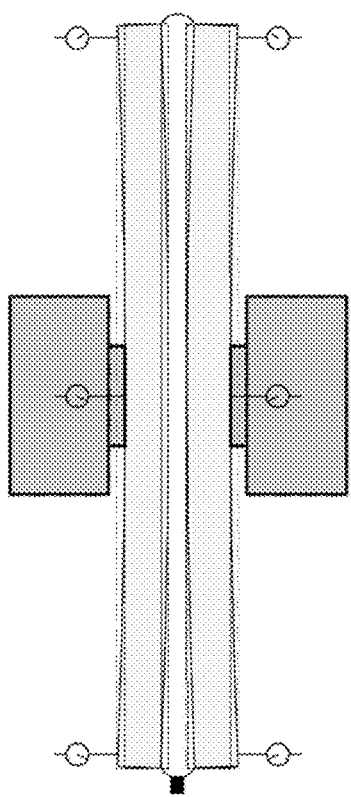
FIG. 3A illustrates displacement of a stabilizer mat according to an embodiment of the invention.
Figure 3B:
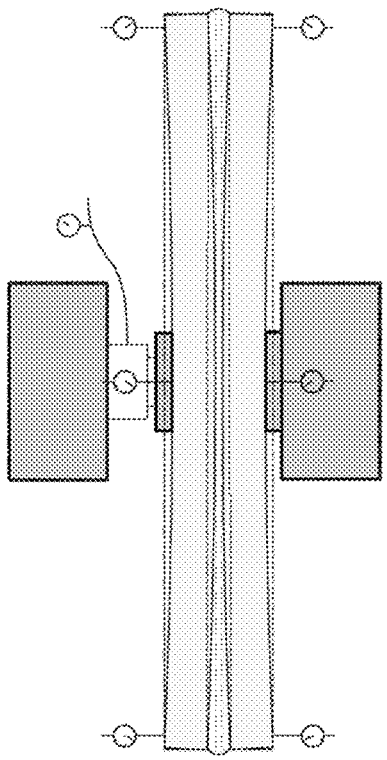
FIG. 3B illustrates displacement of a stabilizer mat according to another embodiment of the invention.
Figure 3C:
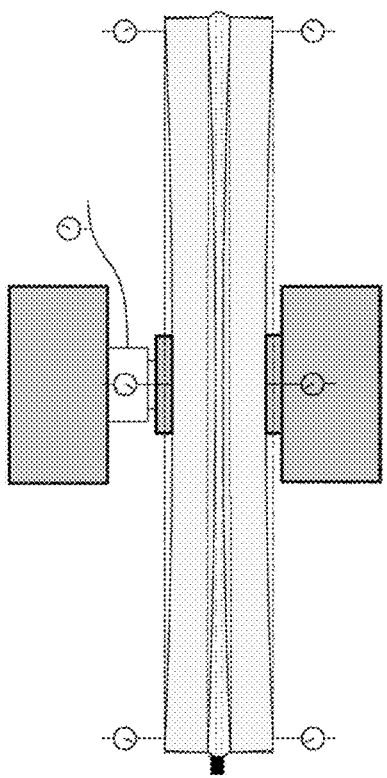
FIG. 3C illustrates displacement of a stabilizer mat according to yet another embodiment of the invention.
Figure 4:
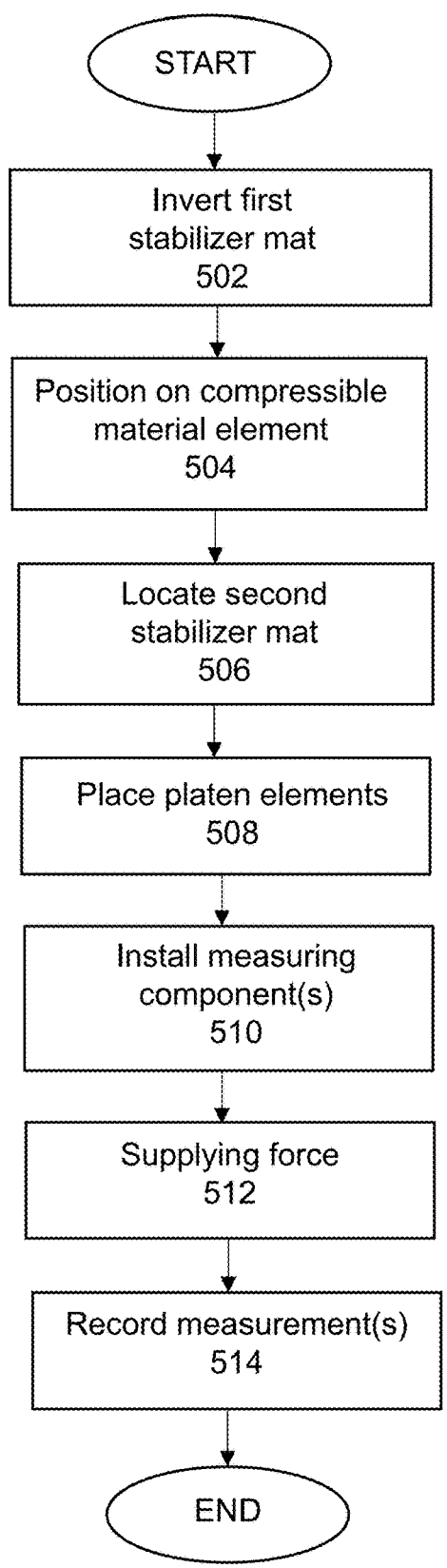
FIG. 4 is a flow chart of a method for testing stabilizer mats according to an embodiment of the invention.

FIG. 3A, FIG. 3B, and FIG. 3C illustrate displacements of the stabilizer mat according to the embodiments described by FIG. 1A, FIG. 1B, and FIG. 1C, respectively.

Figure 5:
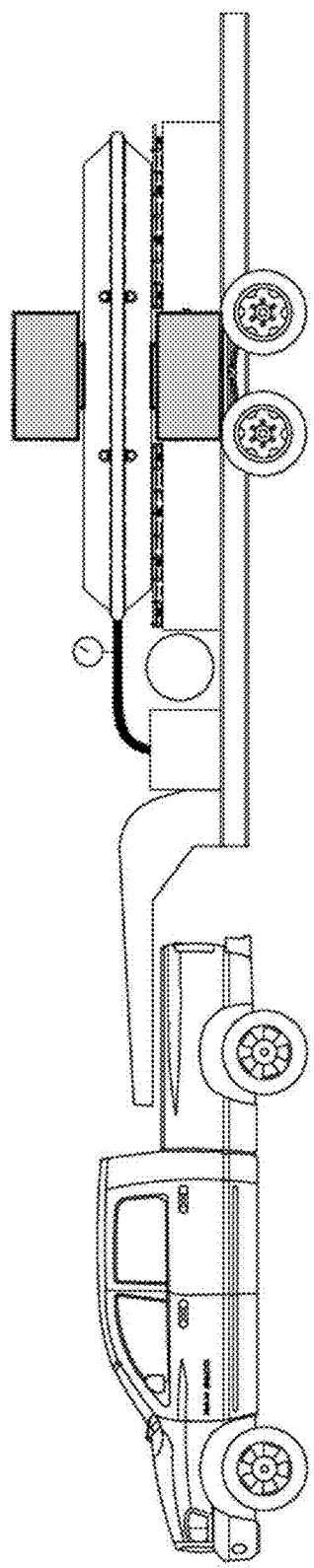
FIG. 5 illustrates an exemplary embodiment of a test system for outrigger crane mats according to a contemplated embodiment of the invention.

FIG. 5 is a flow chart of a method 500 for testing stabilizer mats according to an embodiment of the invention. A first stabilizer mat is inverted at step 502. The inverted map may be placed on a transfer device as described further below. The compressible material element is positioned on the inverted stabilizer mat at step 504. A second stabilizer mat is located on the opposing side of the compressible material element at step 506; one side of each stabilizer mat rests on the compressible material element. Platen elements are placed on the other side of each stabilizer mat a step 508. Step 508 may further include the placement of the spacer block element along with the platen. Spacer block elements may be located in the center or in a pre-defined location of each stabilizer mat. The stabilizer mats including spacer block elements may be positioned directly between platen elements or the stabilizer mats provided to the test system may be assembled through use of a transfer device—e.g., table with rollers, air transfer system, fork truck, or similar transport systems. A transfer device may be used to move a stabilizer mat into the test system and may include features to provide adjustable height and/or lateral movement of test components. Or the test system may be assembled over the transfer device so that it may be easily moved or relocated.

Measuring components are installed at step 510 to gather displacement values (from measuring component 140), pressure values (from measuring component 160), and force values (from measuring component 175).

The measuring components may be located at the center of both stabilizer mats and at a perimeter of each mat. These components may measure pressure, force, displacement, or any combination thereof. At step 512, force is supplied to the test system. A fluid supply component supplies a fluid to the compressible material element, one or more platen elements supply a load to compressible material element, or both. At step 514, the values measured by the measuring components are recorded. These recorded values include at least displacement values of each stabilizer mat under test. The recorded values may further include pressure values of a fluid supplied to the compressible material element or force values of a load supplied to the compressible material element (using the one or more platen elements). Once testing is complete, pressures and loads on the stabilizer mats may be relieved and final measurements recorded, which can be compared to initial measurements recorded pre-test.

Figure 6:
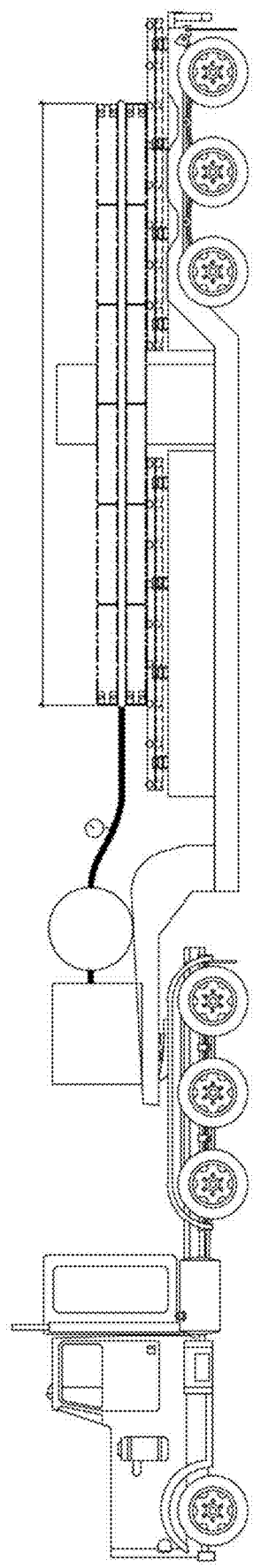
FIG. 6 illustrates an exemplary embodiment of a test system for crawler crane mats according to a contemplated embodiment of the invention.

Requiring that mats be brought to a test facility may require significant resources. Thus, in addition to stationary systems, mobile or transportable test systems may be provided such as those shown for exemplary purposes in FIG. 6 and FIG. 7. As shown, the test system may be transportable such as on a chassis (e.g., truck, trailer, barge, boat, or another vehicle). Such systems can be easily transported to a preferred location or site such as at an owner's yard, construction site or any other location. It is contemplated that mobile test systems may include components that are collapsible or re-orientable on the chassis for ease of transport from site to site. Mobile testing may further facilitate acceptance of testing and certification implementation within the industry by reducing cost of service and providing rapid certification, possibly without unduly impacting construction schedules.

Stabilizer mats include a load rating defined by an amount of load it can safely support. In addition, the ground surface (e.g., soil) has a calculated safe load or bearing capacity that it can support as determined such as by an engineer. These two loads are rarely if ever the same.

To determine a desired pressure or load to be achieved during test, calculations may be performed. Thus, the maximum load to be applied to the stabilizer mats during test may be determined. And calculations may be used to determine a maximum pressure to be applied to the compressible material element during test including a maximum hydraulic pressure to be applied given a particular jack being used.

For exemplary purposes, calculations are performed on a stabilizer mat that is 12 foot long by 8 foot wide with a load rating of 480,000 lb. Therefore, at full load (480,000 lb), average pressure under the mat will be 480,000 lb/(12 ft.×8 ft.)=480,000/96 square feet=5,000 lb per square foot (psf) or, alternatively 5,000 PSF/144 square inches=34.72 psi In this example, the compressible material element may be inflated to 34.72 psi for mat capacity validation. It is contemplated, however, that additional pressure could be applied such as 125% of maximum load. In this case the pressure applied would be 34.72 psi×1.25=43.4 psi. At 42.4 psi the total load applied to the mat would be 42.4 psi×144 sq. in.×12 ft.×8 ft=586,138 lb.

When the ground surface strength governs there may also be a deformation limit placed on the mat (especially if mat is placed over underground structures—pipes, vaults, etc.). If the safe load or bearing capacity at surface is 3,000 psf and deformation of mat is limited to 0.25", the bladder would be inflated to 3,000 psf (or 3,000 psf/144 sq. in.=20.83 psi). Displacement is measured to not exceed the limit of 0.25". Alternatively, a force could be applied to the hydraulic ram of 3,000 psf×12 ft.×8 ft.=288,000 lb with displacement read from the dial gauges to validate that the maximum mat deflection/deformation does not exceed the limit of 0.25".

In the case of hydraulic jack, the pressure applied to the ram can be converted according to the formula: Force applied=Pressure of hydraulic fluid×Area of Ram.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A test system for stabilizer mats, the system comprising:
   a compressible material component comprising a first surface and a second surface, wherein the first surface is configured to receive a first stabilizer mat and the second surface is configured to receive a second stabilizer mat with one of the stabilizer mats being inverted;
   a first platen element and a second platen element, wherein the compressible material is positioned between the platen elements;
   a fluid supply component provides a fluid to the compressible material component;
   a first measuring component measures one or more pressure values resultant from the fluid supplied to the compressible material component;
   a second measuring component measures one or more displacement values obtained from one or more of the first stabilizer mat and the second stabilizer mat; and
   a data collection component records the one or more pressure values and the one or more displacement values.

2. The test system according to claim 1 further comprising:
   a load supply component provides a load to one or more of the platen elements; and
   a third measuring component measures one or more force values resultant from the load supplied to the compressible material component.

3. The test system according to claim 2, wherein the data collection component further records the one or more force values.

4. The test system according to claim 1, wherein both the first platen element and the second platen element are fixed.

5. The test system according to claim 2, wherein one of the platen elements is fixed.

6. The test system according to claim 5, wherein one of the platen elements includes a hydraulic jack.

7. The test system according to claim 1 further comprising a relief element connected to the fluid supply component.

8. The test system according to claim 1 further comprising a reservoir element connected to the fluid supply component.

9. The test system according to claim 1, wherein the compressible material element is an inflatable bladder element.

10. The test system according to claim 1, wherein each platen element further comprises a spacer block element.

11. The test system according to claim 10, wherein the spacer block element is shaped the same as the stabilizer mat under test.

12. The test system according to claim 1, wherein the fluid is a liquid.

13. The test system according to claim 1, wherein the fluid is a gas.

14. The test system according to claim 1, wherein the fluid is air.

15. A test system for stabilizer mats, the system comprising:
   a compressible material component comprising a first surface and a second surface, wherein the first surface is configured to receive a first stabilizer mat and the second surface is configured to receive a second stabilizer mat with one of the stabilizer mats being inverted;
   a first platen element and a second platen element, wherein the compressible material is positioned between the platen elements;
   a load supply component provides a load to one or more of the platen elements;
   a first measuring component measures one or more force values resultant from the load supplied to the compressible material component;
   a second measuring component measures one or more displacement values obtained from one or more of the first stabilizer mat and the second stabilizer mat; and
   a data collection component records the one or more force values and the one or more displacement values.

16. The test system according to claim 15, wherein one of the platen elements is fixed.

17. The test system according to claim 15, wherein the compressible material element is an inflated bladder element.

18. The test system according to claim 15, wherein each platen element further comprises a spacer block element.

19. The test system according to claim 18, wherein the spacer block element is shaped the same as the stabilizer mat under test.

20. A method for testing stabilizer mats, the method comprising:
   inverting a first stabilizer mat;
   positioning the first stabilizer mat on a first surface of a compressible material component;
   locating a second stabilizer mat on a second surface of the compressible material component;
   placing a first platen element on the first stabilizer mat and a second platen element on the second stabilizer mat;
   installing one or more measuring components on the one or more stabilizer mats, the one or more measuring components configured to measure displacement values;
   supplying a force, wherein a fluid is supplied to the compressible material element by a fluid supply component and a load is supplied to the compressible material element by a load supply component, or both; and
   recording the displacement values measured by the one or more measuring components.

* * * * *